(12) United States Patent
Singh et al.

(10) Patent No.: US 7,602,794 B2
(45) Date of Patent: Oct. 13, 2009

(54) IMPLEMENTATION OF CONTROL PLANE PROTOCOLS AND NETWORKING STACKS IN A DISTRIBUTED NETWORK DEVICE

(75) Inventors: Ranjeeta Singh, Fremont, CA (US); Rajeev D. Muralidhar, Bangalore (IN)

(73) Assignee: Intel Corporation, Santa Clara, CA (US)

(*) Notice: Subject to any disclaimer, the term of this patent is extended or adjusted under 35 U.S.C. 154(b) by 1040 days.

(21) Appl. No.: 10/714,412

(22) Filed: Nov. 13, 2003

(65) Prior Publication Data

US 2005/0108315 A1     May 19, 2005

(51) Int. Cl.
*H04L 12/28* (2006.01)
(52) U.S. Cl. .................. 370/401; 370/466; 370/252
(58) Field of Classification Search .................. None
See application file for complete search history.

(56) References Cited

U.S. PATENT DOCUMENTS 6,985,493 B1 * 1/2006 Roumas ............... 370/465

2003/0128668 A1    7/2003   Yavatkar et al.
2004/0205215 A1 * 10/2004   Kouvelas et al. ........... 709/231

OTHER PUBLICATIONS

The Network Processing Forum (NPF), *Software API Framework Implementation Agreement, Revision 1.0*, 2002, pp. 1-21.

* cited by examiner

*Primary Examiner*—Duc C Ho
(74) *Attorney, Agent, or Firm*—Marger Johnson & McCollom, PC

(57) ABSTRACT

A network device, such as a router or switch, uses multiple forwarding and control processors that operate different protocols or operating systems to route a packet in a computer network. A support stack module determines which processor a packet is routed to and converts the packet format, if necessary, for compatibility with the processor. When a packet is directed to a control processor, its associated support stack module simulates the forwarding plane interfaces. After processing the packet is routed onto the network.

19 Claims, 4 Drawing Sheets

IMPLEMENTATION OF CONTROL PLANE PROTOCOLS AND NETWORKING STACKS IN A DISTRIBUTED NETWORK DEVICE

FIELD OF THE INVENTION

The present invention relates to operation of control and forwarding plane protocols and network stacks in a distributed network device such as a switch or router.

BACKGROUND OF THE INVENTION

Most network devices, such as routers and switches, include at least two operational planes, namely a control plane and a forwarding plane. The control plane typically executes various signaling, routing, and other control protocols in addition to configuring the forwarding plane. The forwarding plane usually performs packet processing operations such as IP forwarding and classification.

In the prior art, control processes and forwarding processes were executed on a common processing resource. More recently, the control and forwarding planes have been separated so that their respective processes could be executed on separate processing resources, which may even be from different vendors.

As a result, a more formal and standardized definition of the interface between the control and forwarding planes is required. For example, the Network Processing Forum (NPF) is developing an application programming interface (API) that facilitates communication between the control and forwarding planes in a distributed element architecture.

Operational characteristics that are important in such a distributed architecture include scalability, i.e., the ability to easily add resources; high availability; and robust signaling and routing protocol implementations. Optimizing these characteristics is more difficult when components are manufactured by different vendors, are distributed across different backplanes or run different operating systems.

DETAILED DESCRIPTION OF THE PREFERRED EMBODIMENT

Indicated generally at 10 is a network device, such as a router or switch. Device 10 includes two control elements 14, 16 and a plurality of forwarding elements, two of which are forwarding elements 20, 22. In the present embodiment, all of the forwarding and control elements comprise circuit boards that are connected to a common backplane 24. But the invention can be equally well-implemented in a network in which the control elements and forwarding elements are connected to different backplanes. In the latter scenario, communication among at least some of the various elements must occur across different backplanes.

Figure 1:
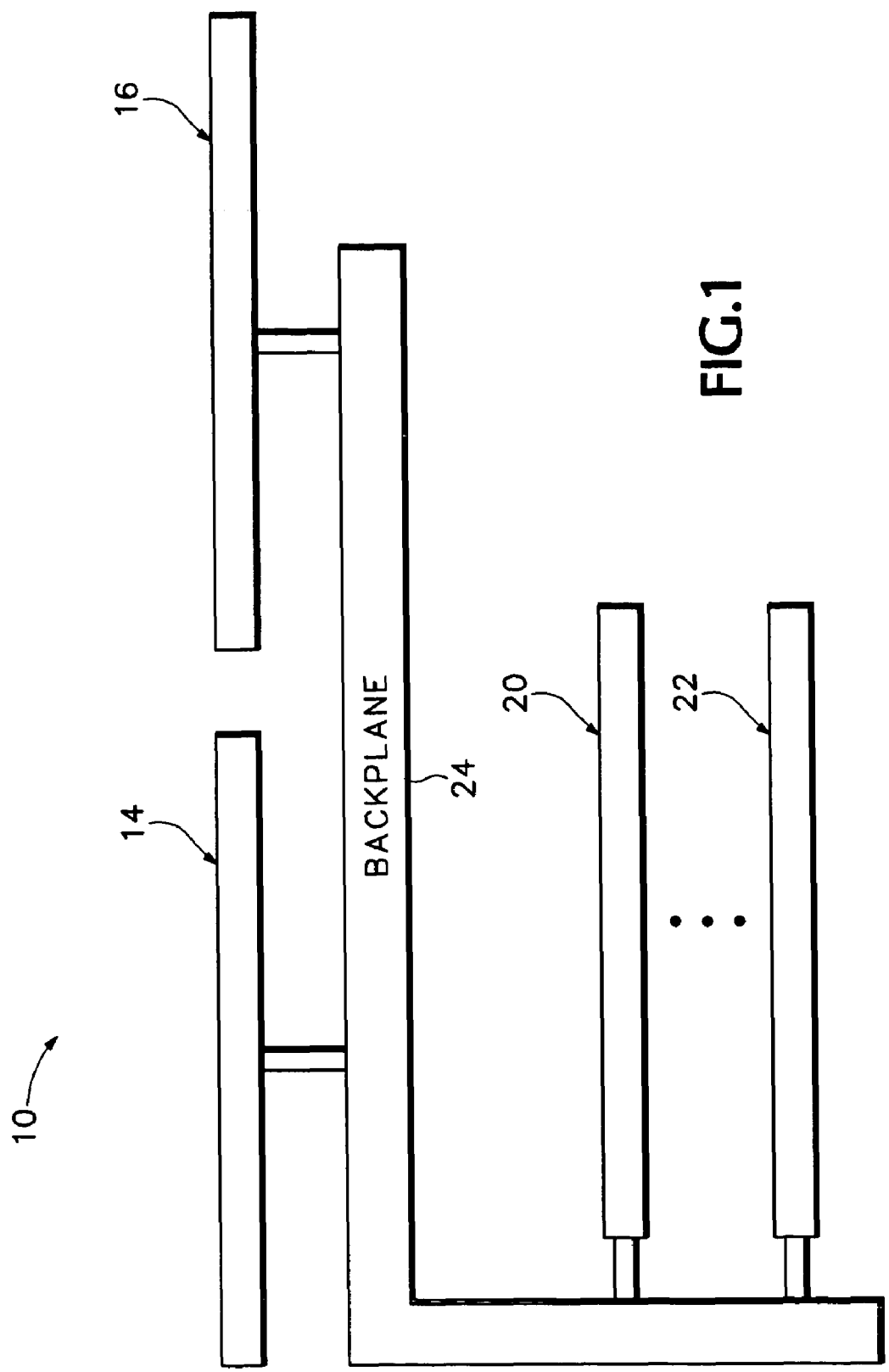
FIG. 1 is a highly schematic diagram of distributed components in a network device.

Control element 14 in the present embodiment of the invention includes an embedded Intel processor (not visible in FIG. 1). It should be appreciated that other Intel processors or processors from other vendors could also be used to implement the invention. As will be described in more detail, the control plane processor is responsible for running protocol stacks. Control element 16 also includes a processor although it may be configured for running different protocol stacks. And as mentioned above, it may also run a different operating system than the processor on control element 14.

Forwarding elements 20, 22 in the present embodiment comprise line cards, each including a network processor (not visible in FIG. 1). In the present embodiment of the invention, the forwarding plane is implemented with an Intel IXP Network Processor, such as the IXP 2400. These line cards can be implemented with one or more IXP processors or with an additional stand alone general-purpose processor. Other Intel processors or processors from other manufacturers could also be used to implement the invention. Like the control elements, each of the forwarding elements can operate different protocol stacks or applications, including control functions.

The present invention can be implemented with any number of forwarding elements or control elements that connect to different backplanes or run different operating systems.

Figure 2:
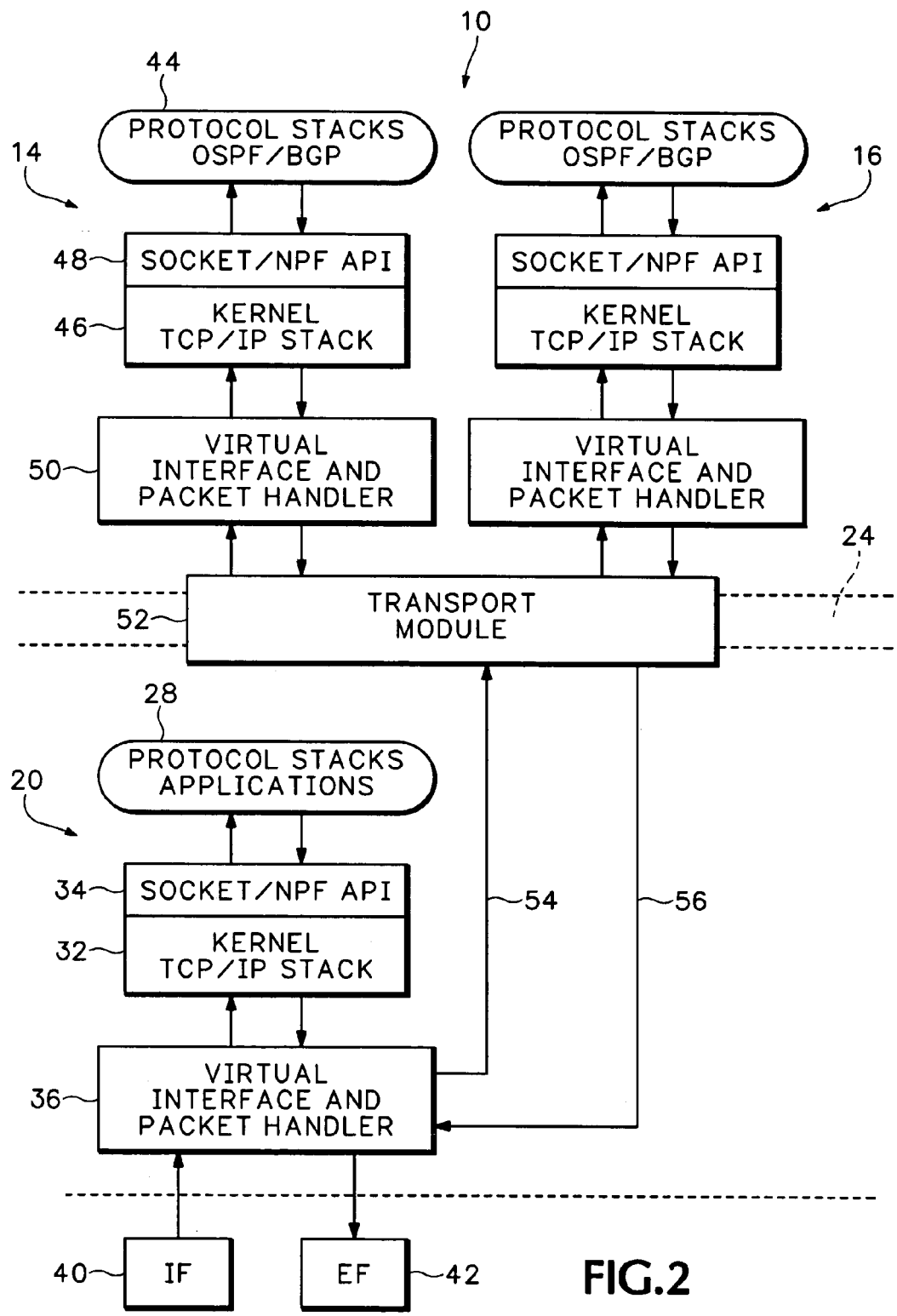
FIG. 2 is a functional block diagram illustrating some of the component portions of the FIG. 1 device.

The functional block diagram of FIG. 2 incorporates both control elements 14, 16 but only one of the forwarding elements, namely element 20. As will be explained in more detail, however, the description of element 20 in FIG. 2 applies generally to each of the other forwarding elements, like forwarding element 22, in device 10. Including only one of the forwarding elements simplifies the drawing to facilitate description of device 10.

Considering first forwarding element 20, the network processor thereon runs a number of processes, including protocol stacks and applications 28 and operating system kernel and TCP/IP stack 32. Protocol stacks and applications 28 send and receive packets through either a traditional socket 34 or a standardized API like the NPF API 34. A virtual interface and packet handler 36, together referred to as a stack support module, provide for communication between protocol stacks and applications 28 and a device ingress interface (IF) 40 as well as a device egress interface (EF) 42. Interface 40 receives network communications from a network forwarding engine in the form of packets that are presented to device 10 via interface 40. In a similar fashion, interface 42 receives packets from virtual interface 36 and presents them to the network forwarding engine.

Considering now the functional structure of control element 14, the network processor thereon runs a number of processes, including protocol stacks and applications 44 and operating system kernel and TCP/IP stack 46. Protocol stacks and applications 44 send and receive packets through either a traditional socket or a standardized API like the NPF API 46. A virtual interface and packet handler 50, together referred to as stack support module, provide for communication between protocol stacks and applications 44 and a transport module 52, which is distributed among all of the control and forwarding elements. Transport module 52 comprises an interface that facilitates packet transmission between a forwarding element and a control element in both directions, as will be later described hereinafter.

Transport module 52 hides the specifics of the physical interconnection and associated transport protocols used to exchange information between the control plane, on the one hand, and the forwarding plane, on the other hand. It provides a connection-oriented interface to set up connections and transfer data between any control element and any forwarding element in the system and takes care of managing the underlying transport protocols and interconnects. This transport module is a 'plug-in,' such that it can be changed and updated without affecting any of the other plug-ins. New plug-ins can therefore be easily added to support additional interconnects and associated transport protocols.

Line 54, 56 provide communication in both directions, as shown in the drawing, between virtual interface and packet handler 36 and transport module 52. Packet handler 36 in turn communicates packets to and from interfaces 40, 42.

Control element 16 includes functional components that are similar to control element 14. As noted above, however, the control elements may operate different protocol stacks or network processes and may further run operating systems that differ from one another and from one or more of the forwarding elements. When additional forwarding elements (not shown) are provided, each also includes an input, like line 54, to transport module 52 and an output, like line 56, from the transport module to virtual interface and packet handler 36. Like the control elements, multiple forwarding elements may be run different processes or operating systems.

As can be seen, each of the control elements interfaces with transport module 52 to both receive packets from and send packets to the transport module. Further, virtual interface and packet handler 36 in forwarding element 20 can route packets to control elements 14, 16 via transport module 52 on line 54. Such routing occurs under circumstances that are explained shortly in connection with the description of FIGS. 3 and 4. In a similar fashion, line 56 receives packets from any of the control elements via module 52 and places them on device egress interface 42, through stack support module 36, which communicates the packet to the network beyond device 10.

Figure 3:
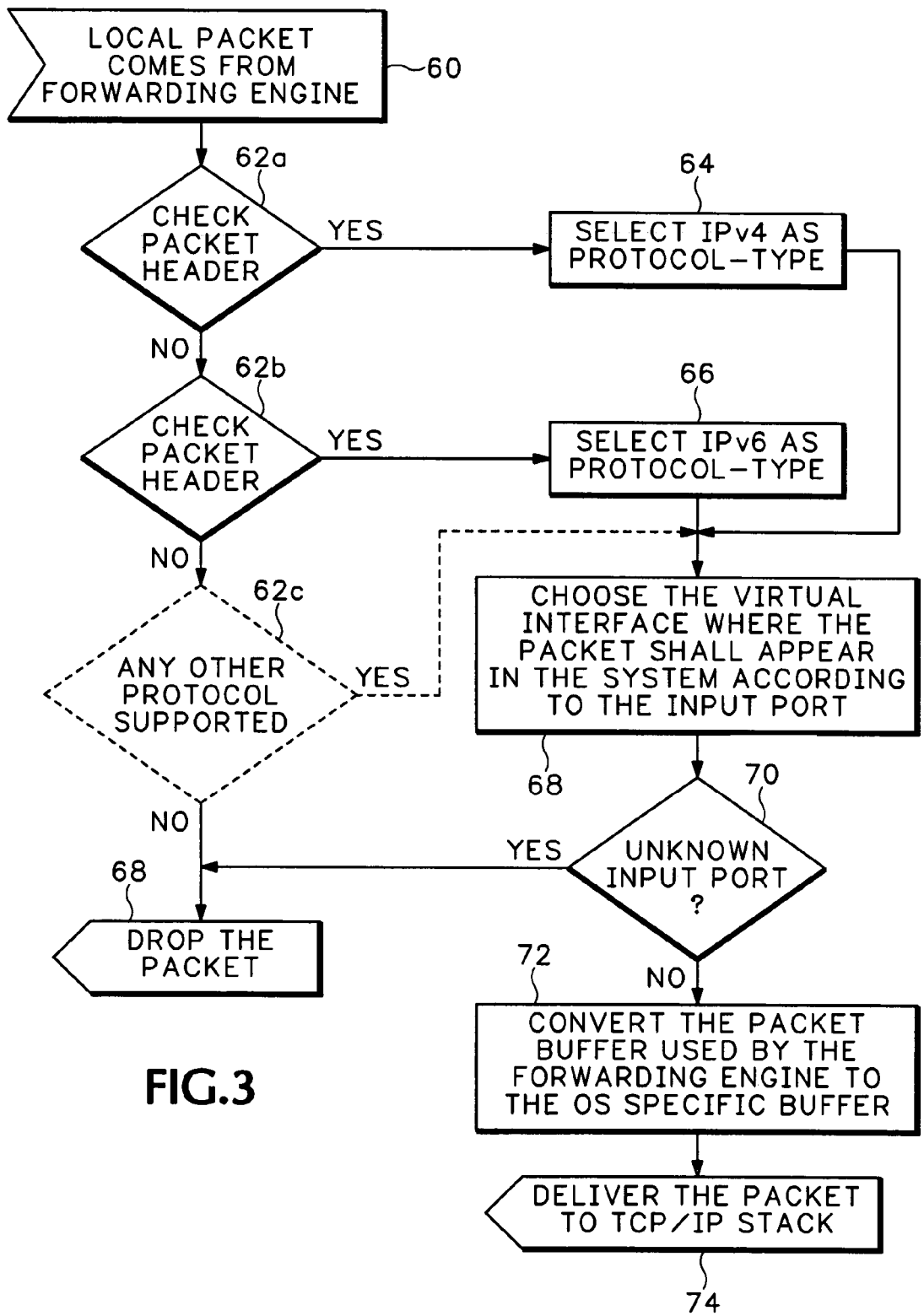
FIGS. 3 and 4 are flow diagrams of processes that can be used to implement functions depicted in FIG. 2.

Turning now to FIG. 3, consideration will be given to how device 10 deals with a packet delivered 60 to it by a network forwarding engine. First, a packet is delivered to device 10 via interface 40 from a remote forwarding engine (not shown) located elsewhere on the network. The packet handler checks 62a, 62b, 62c the packet header to determine the protocol to which the packet relates. If, for example, the packet header relates to Internet Protocol version 4 (IPv4), that protocol type is selected 64. But if the packet relates to another protocol, e.g., Internet Protocol version 6 (IPv6), that protocol type is selected 66 as the protocol type. These protocols are provided as examples of but two of a number of protocols for different processes that could be implemented in device 10. The packet, if not belonging to either IPv4 or IPv6 protocols, is checked 62c for any other supported protocol, and if a match is found, that protocol type is selected (not shown on flow chart). If the packet is not associated with a protocol that is supported in device 10, the packet is dropped 68.

Assuming that a supported protocol type is selected, the process then chooses 68 a virtual interface associated with one of the control elements, like control element 14, 16, or with one of the forwarding elements, like forwarding element 20, dependent upon the protocol with which the packet is associated and upon which element is running that protocol. For example, if the packet is associated with a protocol in protocol stacks 28 on forwarding element 20, virtual interface 36 presents the packet to the appropriate interface in element 20. On the other hand, if the packet is associated with a process run on one of the control elements, e.g. control element 16, packet handler 36 routes the packet via line 54 and transport module 52 to the virtual interface in control element 16 where it is presented to the appropriate input port, i.e., the one associated with the chosen protocol, in element 16. If the port cannot be located 70, the packet is dropped 68.

After the packet is delivered to the appropriate virtual interface, as described above, it is converted 72, if necessary, to the operating system associated with the element to which the packet has been delivered. In other words, the packet buffer supported by forwarding element 20 might not be compatible with the operating system supported by the protocol stack to which the packet has been delivered. If so, the virtual interface to which the packet is delivered converts 72, the packet from the packet buffer used by the forwarding engine to the packet buffer specific to the operating system associated with the protocol stack that will process the packet. Upon conversion, the packet is delivered 74 to the TCP/IP stack for processing. Such conversion is provided for at each of the forwarding and control processors.

The virtual interfaces appear to the protocol and networking stacks as local interfaces. This allows traditional router software to send and receive packets on the virtual interfaces. The virtual interfaces on the control elements, like virtual interface 50, simulate the forwarding-plane physical interfaces on the control plane.

The virtual interface includes an operating system device driver that simulates the interfaces. For example, if control element 14 runs a Linux OS, a Linux device driver dynamically simulates the forwarding plane interfaces as network devices to the Linux OS 46. A person with ordinary skill in the art can readily implement such a device driver in Linux and in other operating systems that may be functioning on the device processors.

The virtual interfaces can be configured from a user program so that user interfaces can be created or deleted depending upon the state of the physical plane interface. The number of virtual interfaces depends upon how many addresses need to be supported. These can be changed on the fly. For example, in a Linux based system, a layer of software in the user space that is in communication with the forwarding element detects an interface change made by a user. It then makes an Input/Output Control (IOCTL) call to the virtual interface driver to change the state of the interfaces.

In addition, a user configuration file can be used to configure the device to route the packets only to selected processors in device 10. Or the internal routing can be based on packet content. For example, all packets relating to control functions could be diverted by packet handler 36 to a selected one or more of the control processors.

Figure 4:
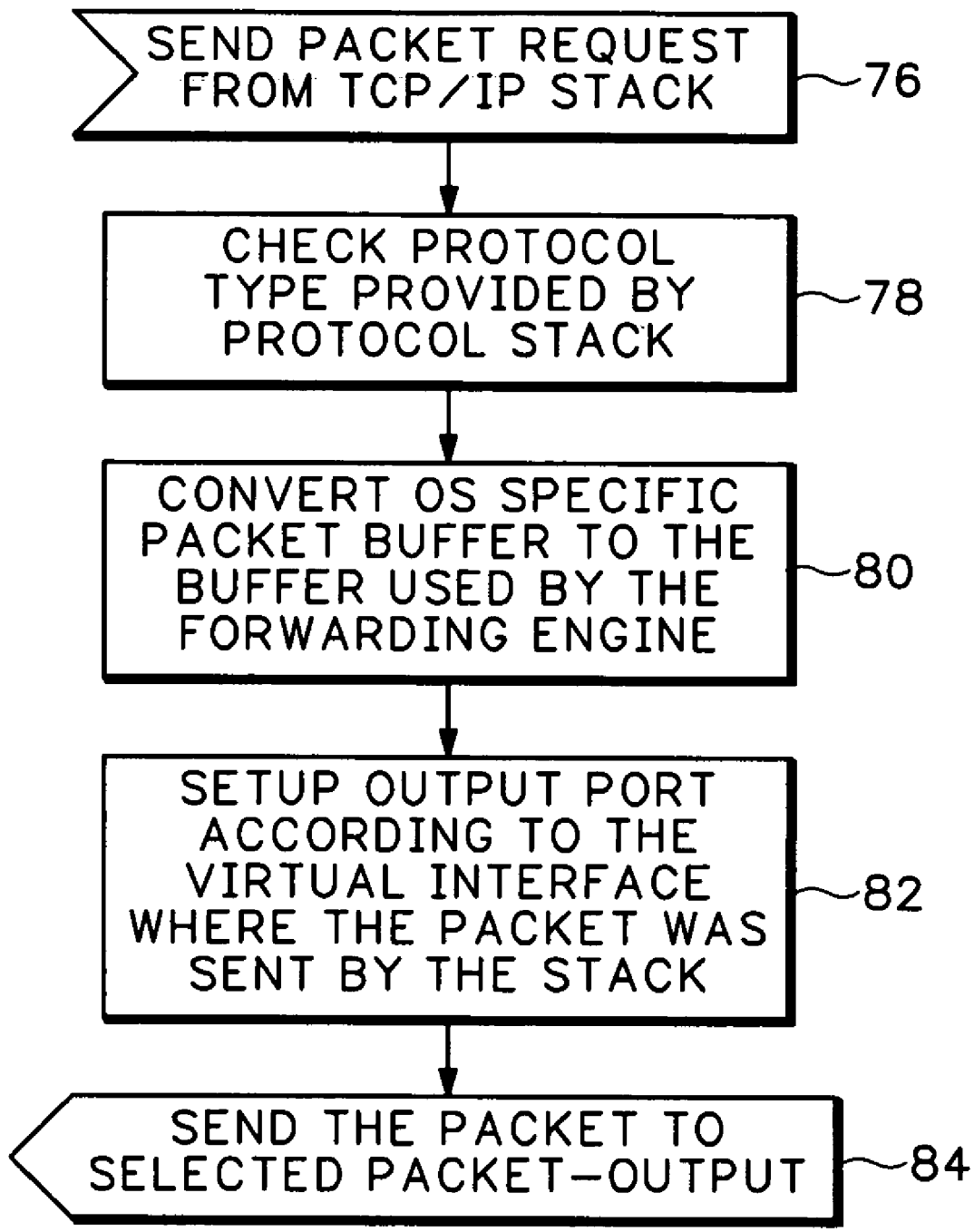

Turning now to FIG. 4, consideration will be given to how a packet that has been processed by one of the protocols or applications run on any of the control or forwarding elements is output from device 10 to the network. For example, a packet processed in protocol stacks 44 of control element 14 is requested 76 by TCIP/IP stack 46. Virtual interface 50 checks 78 the protocol type of the packet provided by the protocol stack. If the operating system specific packet buffer associated with control element 14 is different from the buffer used by the forwarding engine, the packet is converted 80. Thereafter, an output port is set up 82 dependent upon the virtual interface that received the packet. The packet is thereafter sent 84 to the port via transport module 52 and from there to egress interface 42, via virtual interface and packet handler 36, which places the packet on the network beyond device 10.

Some embodiments of the invention may be machine-readable mediums with instructions stored thereon. These instructions, when executed, cause the machine to execute the processes that were described above.

This device facilitates easy scalability to provide high availability or to provide support for additional protocols. If more forwarding or control processors are needed—for either reason—a new board can simply be plugged into the backplane. Because the virtual interfaces and packet handlers support different operating systems and/or different protocols, packets are routed to and from the new board as described above without the need for extensive additional programming to create a custom interface.

The invention claimed is:

1. A network device comprising:
   at least two control processors running different protocol stacks;
   at least one forwarding processor communicatively coupled to the at least two control processors;
   at least one ingress interface for connecting the network device to a network;
   a packet handler interposed between the at least one forwarding processor and the at least one ingress interface, said packet handler being constructed and arranged to receive a packet from the ingress interface, determine if it is bound for one of the at least two control processors, and, if so, direct it to the one of the at least two control processors; and
   a virtual interface interposed between the at least two control processors and the ingress interface, said virtual interface being constructed and arranged to receive a packet from the ingress interface, determine if it is compatible with an operating system running on the one of the at least two control processors, and, if necessary, convert it to a compatible format for the operating system.

2. The network device of claim 1 wherein said network device comprises a router.

3. The network device of claim 1 wherein said network device comprises a switch.

4. The network device of claim 1 wherein said network device is configured to run different operating systems on said control processor and said forwarding processor.

5. The network device of claim 1 wherein said virtual interface is further constructed and arranged to receive a packet from the control processor, determine if it is compatible with an operating system running on the forwarding processor, and, if necessary, convert it to a compatible format for the forwarding-processor operating system.

6. The network device of claim 1 wherein said network device further includes at least one egress interface for connecting the network device to a network and wherein said network device further comprises a packet handler constructed and arranged to direct a packet from the control processor to a selected egress interface.

7. The network device of claim 1 wherein said virtual interface is further constructed and arranged to select an appropriate control processor input port to receive the packet.

8. A network device comprising:
   at least two control processors running different protocol stacks;
   at least one forwarding processor communicatively coupled to the at least two control processors;
   at least one ingress interface for connecting the network device to a network; and
   a packet handler interposed between the forwarding processor and the ingress interface, said packet handler being constructed and arranged to receive a packet from the ingress interface, determine if it is bound for one of the control processors, and, if so, direct it to said one control processor.

9. The network device of claim 8 wherein said network device comprises a router.

10. The network device of claim 8 wherein said network device comprises a switch.

11. The network device of claim 8 wherein said network device is configured to run different operating systems on at least one of said control processors and said forwarding processor.

12. The network device of claim 8 wherein said network device further includes a virtual interface interposed between the control processor and the ingress interface, said virtual interface being constructed and arranged to receive a packet from the ingress interface, determine if it is compatible with an operating system running on the control processor, and, if necessary, convert it to a compatible format for the operating system.

13. The network device of claim 12 wherein said virtual interface is further constructed and arranged to receive a packet from the control processor, determine if it is compatible with an operating system running on the forwarding processor, and, if necessary, convert it to a compatible format for the forwarding-processor operating system.

14. The network device of claim 8 wherein said network device further includes at least one egress interface for connecting the network device to a network and wherein said network device further comprises a packet handler constructed and arranged to direct a packet from the control processor to a selected egress interface.

15. A method for operating a data network having control and forwarding elements comprising:
   receiving a data packet at a device on the network;
   determining if the packet is bound for a forwarding element or a control element, in which the forwarding element and the control element comprises processors;
   running one operating system on the forwarding element and running a different operating system on the control element;
   determining whether the packet format is compatible with the element for which it is bound; and
   if necessary, converting the format into one that is compatible with the element for which it is bound.

16. The method of claim 15 wherein said method further comprises forwarding the data packet to another device on the network.

17. The method of claim 15 wherein said method comprises routing the data packet.

18. A processing system comprising a processor, which when executing a set of instructions performs the method of claim 15.

19. A computer readable medium encoded with computer executable instructions, which when executed performs the method of claim 15.

* * * * *